3,265,740
PROCESS FOR CHLORINATING ACETONE AND ACETYLACETONE
Viktor Weinmayr, Landenberg, Pa., assignor to E. I. du Pont de Nemours and Company, Wilmington, Del., a corporation of Delaware
No Drawing. Filed July 11, 1962, Ser. No. 209,217
2 Claims. (Cl. 260—593)

This invention is directed to an improvement in the chlorination of acetone and acetylacetone to form hexachloracetone (hexachloro-2-propranone) and octachloroacetylactone (octachloro-2,4-pentanedione) which comprises employing pyridine, a picoline, or an ethylpyridine as the catalyst for the chlorination reaction.

In perchlorinating acetone, the acetone is usually first reacted with chlorine to form di- and trichloroacetones which are then further chlorinated to hexachloroacetone with a high excess of chlorine and either an activated carbon catalyst or the employment of ultraviolet light or pressure. Such a process is not the most efficient or lowest in cost. In such a process, the excess chlorine commonly amounts to 100% of that required to form the final product and therefore this excess chlorine has to be separated, dried, and recovered from the reaction mixture. The process employing carbon as the catalyst requires special apparatus to hold the catalyst, a periodic reactivation of the catalyst, and the usual recovery of the excess chlorine.

In previously disclosed processes for chlorinating acetylacetone, the chlorination has stopped at hexachloroacetylacetone.

It is, therefore, an object of the present invention to provide an improved process for preparing hexachloroacetone and octachloroacetylacetone.

It is another object of the present invention to produce chlorination products of ketones in high purity at high efficiency.

It is a still further object of the present invention to prepare these chlorination products of ketones without special equipment, specially supported catalysts, and the use of a high excess of chlorine.

These and other objects will become apparent by the following description and claims.

These objects are accomplished by chlorinating acetone and acetylacetone to which has been added from about 0.05% to 5.0% of pyridine, a picoline, or an ethylpyridine. The pyridine, in particular, is a low cost, expendable catalyst which presents no recovery problem, requires no special handling or equipment for its use, and permits a complete chlorination with essentially the theoretical amount of chlorine.

More specifically, the present invention is directed to a process for chlorinating a ketone selected from the group consisting of acetone and acetylacetone, the improvement which comprises using as a catalyst for the chlorination reaction from 0.05% to 5.0% by weight of the keytone of a pyridine having the formula

wherein R is hydrogen, methyl, or ethyl.

The conversion of acetone to hexachloroacetone involves two essential steps. The first step is the conversion of acetone to the relatively stable di- and trichloroacetones. The second step is the complete chlorination of the stable di- and trichloroacetones to hexachloroacetone. Numerous ways to chlorinate acetone to dichloroacetone have been described, most of them involving some special operational means of bringing the acetone into contact with the chlorine in such a manner that the chlorination of the acetone takes place more rapidly than does the reaction of the hydrogen chloride, liberated in the chlorination reaction, with unreacted acetone. Hydrogen chloride reacts with acetone to give undesirable products such as 4-methyl-3-penten-2-one, $(CH_3)_2C=CHCOCH_3$, and higher condensed products which can not be chlorinated to hexachloroacetone and are difficult to remove from hexachloroacetone. In some previous processes for chlorinating acetone to the dichloroacetones, the use of catalysts has been disclosed.

The present invention, through beneficial for the preparation of the lower chlorinated acetones, is mainly directed to the final step of the reaction, the conversion of the intermediate polychloroacetones to hexachloroacetone. The present invention is also directed to the conversion of acetylacetone to octachloroacetylacetone. Heretofore, a commercial process for the preparation of octachloroacetylacetone from acetylacetone by chlorination has never been disclosed. This is due to the fact that chlorination stopped when hexachloroacetylacetone was formed. Octachloroacetylacetone has been obtained by the reaction of phloroglucinol with phosphorous pentachloride. However, such a method could not be considered for the commercial production of octachloroacetone.

The present invention discloses a method of providing a distinctly improved chlorination process by carrying out the chlorination of acetone, partially chlorinated acetones, and acetylacetone in the presence of a readily available and especially efficient catalyst such as pyridine, a methyl pyridine (2-, 3-, or 4-picoline). The chlorination of acetone to mixed dichloroacetones is accomplished by using acetone containing 0.05% to 5% by weight of pyridine, preferably 0.5% to 1.5% pyridine. The chlorination of acetone to dichloroacetone is accomplished in the present invention by using the technique, or obvious modifications of it, as described in U.S. 1,916,979 or U.S. 2,271,705 and methods suitable for a continuous plant production, such as chlorination in narrow tubes.

Stable dichloroacetones, possibly containing some trichloroacetones, are obtained with at least 90% yield by chlorinating acetone at 70° to 110° C. The product of this reaction contains none of the undesirable higher boiling by-products mentioned in U.S. 1,916,979. The mixture of dichloroacetones thus obtained is then further chlorinated at 110° to 170° C. as produced or more preferably after an additional amount of from 0.5% to 2.0% of pyridine has been added. From this reaction mixture hexachloroacetone is readily obtained in 90% to 95% yields based on the amount of dichloroacetone charged. A complete and instant reaction of chlorine with the chloroacetones takes place at atmospheric pressure. The conversion to hexachloroacetone is finished when chlorine appears in the exit gases in unmistakable amounts. Thus, crude hexachloroacetone of a purity of 95% and better is readily obtained requiring not more than a 10% of excess of chlorine, an excess used not because of poor reactivity but because chlorine escapes from the reactor with the large amount of hydrogen chloride evolved.

The operation can be accomplished in any of the usual apparatus used for chlorinations. In a batch process the chlorination of the dichloroacetone will start near the boiling point of 1,1-dichloroacetone (120° C.). As the chlorination progresses the temperature will be raised until the reaction is completed at about 150° to 170° C. In a continuous process the mixed dichloroacetones, preferably fortified by an additional amount of from 0.5% to 2% of pyridine, are continuously added to hexachloroacetone which is maintained at 150° to 170° C. while simultaneously introducing into the liquid charge the required amount of chlorine and constantly withdrawing the newly formed hexachloroacetone.

It is an important feature in the first step of the chlorination of acetone that the chlorine is not introduced into the liquid acetone; thereby avoiding the contact of hydrogen chloride with acetone in the liquid phase. However, in the second step the chlorine gas is thoroughly mixed with the liquid reactants.

Octachloroacetylacetone can readily be obtained by introducing chlorine into acetylacetone containing 0.5% to 5% by weight of pyridine, preferably 0.1 to 1.5% pyridine, starting at about 25° C. and raising the temperature as the chlorination progresses to not more than 200° C. and preferably only up to 150° C.

The addition of other catalysts to the reaction mixture such as $PCl_5$, $FeCl_3$, $SbCl_5$, is not required. However, the presence of such other catalysts in the reaction mixture is not detrimental, which is an important condition because when chlorinations are done in metal equipment some contamination of the reaction mixture with heavy metal salts can be expected. It does appear that a higher percentage of pyridine, say 1%–2% of the charge, is required when the reaction is carried out in metal equipment that corrodes, in other words, in the presence of iron or metal chlorides. In all cases it is important that the catalyst be soluble in the reactants in the amounts used. Especially for the first step of the chlorination of acetone it is advantageous that the catalyst have a high vapor pressure at the reaction temperature because most of the chlorination of the acetone appears to take place in the vapor phase.

The reaction temperature range of the initial chlorination of acetone to mixed dichloroacetones can be 30° to 120° C. The preferred reaction temperature range of the initial chlorination of acetone is 80° to 110° C. The reaction temperature for the conversion of the dichloroacetones to hexachloroacetone is 110° to 200° C. (e.g., the span between the approximate boiling temperature of the mixed dichloroacetone and that of the hexachloroacetone). The preferred reaction temperature range for the conversion of the dichloroacetone to hexachloroacetone in a batch chlorination process is 110° to 170° C. and in a continuous process is 150° to 165° C. The reaction temperatures for the chlorination of acetylacetone to octachloroacetylacetone are from room temperature to 200° C., preferably from 40° C. to 150° C.

The pressure at which the reaction is carried out is not critical; all the reactions of the present invention take place at atmospheric pressure. However, for reasons of operational efficiency the process is preferably operated at a pressure of not more than one atmosphere. A pressure of not more than one atmosphere is preferred because the efficiency of scrubbing out volatile reaction products from the hydrogen chloride stream by means of efficiently cooled condensers is thereby improved.

The reaction between chlorine and the ketones at the reaction temperature is practically instantaneous. The reaction times used will be governed by such factors as the efficiency of the dispersion of the chlorine, and the means available for the control of the temperature of the reaction. The reaction is mildly exothermic.

For best results and longest life of equipment it is desirable that the starting materials be as anhydrous as possible. However, acetone containing 0.4% water is successfully chlorinated to hexachloroacetone.

The chlorination can be carried out in any apparatus resistant to the corrosive action of chlorine, hydrogen chloride, and traces of moisture. The process of the present invention can be performed batchwise or in a continuous manner or a combination of both, which ever is preferred.

The hexachloroacetone and octachloroacetylacetone products of the chlorination process are chemical intermediates in the production of useful and valuable fluorine derivatives. In addition, the octachloroacetylacetone, in particular, is useful as a weed killer.

Representative examples illustrating the present invention follow:

Example 1

A chlorination of acetone to hexachloroacetone is carried out in two steps as follows. A glass-lined reactor is fitted with a water-cooled condenser, a dropping funnel, and a chlorine inlet tube reaching about half way down into the reactor. During the course of the first step of the reaction, the chlorine inlet tube is never allowed to dip into the collecting product. The acetone employed of the chlorination contains 0.28% by weight of pyridine. The reactor is charged with 35 parts of the acetone-pyridine solution which is heated to reflux and reacted with about 50 parts of gaseous chlorine gradually introduced through the inlet tube. During this reaction reflux is maintained, and the temperature of the liquid is increased to 90% C. With maintenance of a liquid temperature of between 90° and 100° C. the chlorination is continued with the simultaneous addition of the acetone solution and chlorine in a mole ratio of acetone to chlorine of about 1:2. Over a period of 12 hours the total acetone added is 348 parts (6.0 mols), and the total chlorine is 859 parts (12.1 mols). The by-product hydrogen chloride is removed through the condenser during the reaction. The liquid reaction product comprises 714 parts of a mixture of dichloroacetones having a pale yellow color and a specific gravity at 25° C. of 1.31. The amount of material corresponds to 93.7% yield baseed on the acetone consumed. The foregoing procedure constitutes the first step of the chlorination of acetone to hexachloroacetone.

The second step of the operation is accomplished by fitting the end of the chlorine inlet tube with a perforated disc to disperse the gas and lowering it to the bottom of the reactor so that the chlorine is discharged beneath the liquid contained within the reactor. The reactor is now charged with 635 parts (5 mols) of the crude dichloroacetones produced above, to which 2.5 parts of pyridine have been added, and which is heated to 110° C. Over a period of six hours 1435 parts (20.25 mols) of chlorine are introduced while the temperature is raised to 160° C. as the vapor pressure of the chlorination product decreases. Crude hexachloroacetone amounting to 1294 parts, having a yellow color, a specific gravity of 1.725 at 25° C. and a freezing point of −6.1° C. is obtained. This chlorinated acetone product is identified as hexachloroacetone and found to compose 95.6% of the chlorinated product by vapor phase chromatography. The yield of hexachloroacetone from the dichloracetone in this second step is 94.3%, and its over-all yield from acetone is 87.4%.

When 3-picoline is used as the catalyst in place of pyridine essentially the same results are obtained.

Example 2

165 grams (2.85 mols) of acetone are mixed with 0.6% by weight of pyridine and chlorinated in the following manner. This solution is added simultaneously with chlorine in an approximate ratio of one mole of acetone and two moles of chlorine into a glass tube which is held nearly horizontal with a very slight slant away from the inlet point of the reactants. The glass tube, 9 mm. in diameter and 90 cm. in length, is electrically heated over its entire length to a temperature of 90–100° C. The acetone is steadily dropped into the incoming gaseous chlorine stream over a period of six hours. The total amount of chlorine added is 447 (6.3 mols). The reaction product formed is a mixture of 1,1- and 1,3-dichloroacetone, containing possibly some trichloroacetones, weighing 340 g. Assuming it to be dichloroacetones this corresponds to a yield of 94.8% based on acetone. The product is waterwhite and does not change upon storage at room temperature even without the use of stabilizers. The specific gravity at room temperature is 1.310. 254 grams (2 mols) of this crude dichloroacetone to which is added 1 gram of pyridine is chlorinated further as follows. 150 grams of crude hexachloroacetone from a previous reaction is heated to 160° C. in a vertical glass tube (5 cm. x 40 cm.) provided with a water cooled condenser. The dichloroacetones are uniformly added over a period of six hours from a dropping funnel while chlorine is lead into the liquid at an approximate rate of four moles of chlorine per mole of dichloroacetones. The reaction temperature is maintained at 150° to 160° C. A definite excess of chlorine is visible after 605 g. (8.5 moles, equal to an excess of 6% over theory) of chlorine have been added. The new hexachloroacetone formed amounts to 520 g. (total weight 670 g.) which is a yield of 98% based on dichloroacetone or 92.4% based on acetone. It has a pale yellow color, a specific gravity at 25° C. of 1.737, and a freezing point of —3.4° C. It analyzes 98.9% pure by vapor phase chromatography.

*Example 3*

522 grams (5.2 mols) of acetylacetone containing 2 grams of pyridine are chlorinated in a glass flask until a weight increase of 1204 g. is obtained. Chlorine is first introduced at about 40° C. and as soon as chlorine appears to pass through unreacted the temperature is gradually raised to 150° C. and chlorination is continued at 150° C. until no more chlorine is taken up. A total of 3680 g. (51.9 mols) chlorine (about 25% excess over theory) is used over a period of twenty hours. The pale yellow reaction mass is distilled, and 1582 g. of crude octachloroacetylacetone (octachloro - 2,4-pentanedione) distilling at 125° C./3 mm. is obtained. This is equal to a yield of 81% of theory based on acetylacetone. After further fractionation at least 81% of this once-distilled product is collected (B.P. 149° C./10 mm.) and identified by infrared and chlorine analyses as octachloroacetylacetone having a freezing point of 36.2° C.

Calculated for $C_5Cl_8O_2$: Cl, 75.5%. Found: Cl, 75.2%.

When the foregoing chlorination is repeated using 3 ethyl pyridine as the catalyst in place of the pyridine, essentially the same results are obtained.

It is understood that a picoline or an ethylpyridine could be substituted as the catalyst in the place of pyridine in the above examples with substantially the same results. It is understood also that the preceding examples are representative and that said examples may be varied within the scope of the total specification, as understood by one skilled in the art, to produce essentially the same result.

As many apparently widely different embodiments of this invention may be made without departing from the spirit and scope thereof, it is understood that this invention is not limited to the specific embodiments thereof except as defined in the appended claims.

The embodiments of the invention in which an exclusively property or privilege is claimed are defined as follows:

1. In a process for chlorinating acetone to hexachloroacetone wherein the acetone is contacted and reacted with chlorine at a temperature of from 70° C. to 110° C. to obtain a partially chlorinated acetone, and said partially chlorinated acetone is thereafter contacted and reacted with chlorine at a temperature of from 110° C. to 170° C. to obtain hexachloroacetone, the improvement which comprises carrying out the chlorinations in the presence of a catalyst of the formula

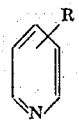

wherein R is selected from the group consisting of hydrogen, methyl, and ethyl, said catalyst being present in the reaction mixture in an amount of from 0.05% to 5.0% by weight of said acetone.

2. In a process for chlorinating acetylacetone to octachloroacetylacetone wherein the acetylacetone is contacted and reacted with chlorine at a temperature of from about 25° C. to 200° C., the improvement which comprises carrying out the chlorination in the presence of a catalyst of the formula

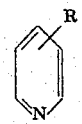

wherein R is selected from the group consisting of hydrogen, methyl, and ethyl, said catalyst being present in the reaction mixture in an amount of from 0.05% to 5.0% by weight of said acetylacetone.

References Cited by the Examiner

UNITED STATES PATENTS 2,199,934  5/1940  Heisel et al. _____ 260—593.5

FOREIGN PATENTS 554,428  7/1943  Great Britain.

OTHER REFERENCES

Brintzinger et al.: Angew. Chem. A60, 311–312 (1948), cited in Chem. Abstracts 43, 2574d (1948).

Karrer: Organic Chemistry, page 808 (1950).

LEON ZITVER, *Primary Examiner.*

L. WEINBERGER, D. HORWITZ, *Assistant Examiners.*